United States Patent
Fan et al.

(10) Patent No.: US 7,323,265 B2
(45) Date of Patent: Jan. 29, 2008

(54) HIGH STABILITY MEMBRANE FOR PROTON EXCHANGE MEMBRANE FUEL CELLS

(75) Inventors: Qinbai Fan, Chicago, IL (US); Hamid Hussain, Bolingbrook, IL (US)

(73) Assignee: Gas Technology Institute, Des Plaines, IL (US)

( * ) Notice: Subject to any disclaimer, the term of this patent is extended or adjusted under 35 U.S.C. 154(b) by 704 days.

(21) Appl. No.: 10/638,904

(22) Filed: Aug. 11, 2003

(65) Prior Publication Data

US 2004/0038107 A1 Feb. 26, 2004

Related U.S. Application Data

(63) Continuation-in-part of application No. 10/289,705, filed on Nov. 7, 2002, now abandoned.

(60) Provisional application No. 60/394,197, filed on Jul. 5, 2002.

(51) Int. Cl.
*H01M 8/10* (2006.01)
(52) U.S. Cl. .............................. 429/30; 429/33; 521/27
(58) Field of Classification Search .................. 429/33, 429/30, 46, 316, 317; 521/27
See application file for complete search history.

(56) References Cited

U.S. PATENT DOCUMENTS

| | | | |
|---|---|---|---|
| 2,913,511 A | 11/1959 | Grubb, Jr. | |
| 3,577,357 A * | 5/1971 | Winkler | 525/203 |
| 4,272,560 A | 6/1981 | Baczek et al. | |
| 4,738,764 A | 4/1988 | Chlanda et al. | |
| 4,766,161 A | 8/1988 | Chlanda et al. | |
| 5,039,752 A | 8/1991 | Storey et al. | |
| 5,239,010 A * | 8/1993 | Balas et al. | 525/314 |
| 5,468,574 A | 11/1995 | Ehrenberg et al. | |
| 5,679,482 A * | 10/1997 | Ehrenberg et al. | 429/249 |
| 6,110,616 A | 8/2000 | Sheikh-Ali et al. | |
| 6,383,391 B1 | 5/2002 | Ehrenberg et al. | |
| 6,413,298 B1 | 7/2002 | Wnek et al. | |
| 2001/0038937 A1 | 11/2001 | Suzuki et al. | |

FOREIGN PATENT DOCUMENTS

| | | |
|---|---|---|
| EP | 1113517 A2 | 7/2001 |
| EP | 1170310 A2 | 1/2002 |
| EP | 1179550 A1 | 2/2002 |
| EP | 1202365 A1 | 5/2002 |
| EP | 1289041 A2 | 3/2003 |
| EP | 1321996 A1 | 6/2003 |
| WO | WO 96/39379 | 12/1996 |
| WO | WO 01/63683 | 8/2001 |

OTHER PUBLICATIONS

Assink, Roger A. et al., "Preparation of Oxidatively Stable cation-exchange Membranes by Elimination of Tertiary Hydrogens", *Journal of Membrane Science*, 56 (1991) 143-151.

* cited by examiner

*Primary Examiner*—Raymond Alejandro
(74) *Attorney, Agent, or Firm*—Mark E. Fejer (57) ABSTRACT

A proton exchange membrane which includes a sulfonated and phosphonated poly (styrene) material having a covalently bonded tertiary hydrogen replacement group.

17 Claims, 10 Drawing Sheets

HIGH STABILITY MEMBRANE FOR PROTON EXCHANGE MEMBRANE FUEL CELLS

REFERENCE TO RELATED APPLICATION

This application is a continuation-in-part application of U.S. patent application Ser. No. 10/289,705, filed 07 Nov. 2002, now abandoned, which application claims the benefit of provisional U.S. patent application Ser. No. 60/394,197, filed 05 Jul. 2002.

BACKGROUND OF THE INVENTION

1. Field of the Invention

This invention relates to electrolyte membranes suitable for use in proton exchange membrane fuel cells. More particularly, this invention relates to low cost polystyrene membranes having high stability for use in proton exchange membrane fuel cells.

2. Description of Related Art

A fuel cell is an electrochemical device in which the chemical energy of a reaction between a fuel and an oxidant is converted directly into electricity. The basic fuel cell unit comprises an electrolyte layer in contact with a porous anode and cathode on either side. In a typical fuel cell, a gaseous or liquid fuel is continuously fed to the anode electrode, sometimes referred to as the fuel electrode, and an oxidant, such as oxygen from air, is continuously fed to the cathode electrode, sometimes referred to as the air electrode, and electrochemical reactions occur at the electrodes to produce an electric current. Due to the limited electricity generating capacity of individual fuel cell units, a plurality of fuel cell units are typically stacked one on top of another with a bipolar separator plate separating the fuel cell units between the anode electrode of one fuel cell unit and the cathode electrode of an adjacent fuel cell unit.

There are a number of different fuel cell types which are classified based upon a variety of categories including the combination of type of fuel and oxidant, whether the fuel is processed external to or inside the fuel cell, the type of electrolyte, e.g. solid oxides, phosphoric acid, molten carbonate and proton exchange membranes, the temperature of operation and whether the reactants are provided to the fuel cell by internal or external manifolds.

This invention relates to proton exchange membrane fuel cells. In a proton exchange membrane fuel cell, also sometimes referred to as a polymer electrolyte membrane fuel cell, the electrolyte is a proton conducting membrane sandwiched between two porous electrodes. The back of the electrodes is made hydrophobic by coating with an appropriate compound, such as TEFLON®. Proton conducting membranes conventionally used in proton exchange membrane fuel cells are made of a perfluorinated sulfonic acid polymer, an example of which is sold under the brand name NAFION® by DuPont. NAFION membranes, which are fully fluorinated polymers, have exceptionally high chemical and thermal stability and are stable against chemical attack in strong bases, strong oxidizing and reducing acids, $H_2O_2$, $Cl_2$, $H_2$ and $O_2$ at temperatures up to about 100° C. NAFION consists of a fluoropolymer backbone upon which sulfonic acid groups are chemically bonded. However, although an exceptional performer, NAFION is an expensive material and makes proton exchange membrane fuel cells economically unattractive in most applications. Much of the cost of NAFION is due to two factors: the use of fluorine and the very severe reaction conditions needed to prepare the polymer.

Accordingly, the challenge is to find lower cost membranes having the desired properties for use as a proton conductor in proton exchange membrane fuel cells. Some of these properties include mechanically stable and durable film behavior in the cell-operating environment with long lifetimes, hydrophilicity for high conductivity and water insolubility.

Low cost membranes in the form of sulfonated polystyrene membranes have been applied to proton exchange membrane fuel cells. U.S. Pat. No. 5,468,574 and U.S. Pat. No. 5,679,482, both to Ehrenberg et al., teach an ion-conducting membrane for a fuel cell comprising a plurality of acid-stable polymer molecules, each having at least one flexible connecting component. The membrane, which is composed of hydrogenated and sulfonated styrene copolymers, is obtained by sulfonating a styrene-(ethylene-butylene)-styrene (SEBS) copolymer to the extent of at least 25 mol %. Less than a stoichiometric amount of sulfonation agent is employed; preferably the amount of sulfonation agent employed is enough to theoretically react with at least about 15% of the available styrene molecular units and preferably in the range of about 40% to about 60% of the available styrene molecular units. Higher sulfonation levels are indicated to decrease the strength of the membranes when they become hydrated. Similarly, U.S. Pat. No. 6,110,616 to Sheikh-Ali et al. teaches an ion-conducting membrane for a fuel cell, which membrane is composed of a hydrogenated and sulfonated statistical copolymer of styrene and butadiene obtained by hydrogenating a copolymer of styrene and butadiene to obtain less than 5% residual unsaturation, then sulfonating the polymer with an acetyl sulfate sulfonation agent to a level of at least 30 mol % sulfonate. The challenge is to improve the stability of these membranes.

SUMMARY OF THE INVENTION

It is one object of this invention to provide a low cost proton conducting membrane suitable for use in proton exchange membrane fuel cells.

It is another object of this invention to provide a proton conducting membrane for use in proton exchange membrane fuel cells that is mechanically and chemically stable and durable under cell operating conditions.

It is another object of this invention to provide a proton conducting membrane for use in proton exchange membrane fuel cells having high conductivity.

These and other objects of this invention are addressed by a proton exchange membrane comprising where Y is a covalently bonded group and R is selected from the group consisting of —SO$_3$H, —PO$_3$H$_2$ and mixtures thereof.

Without wishing to be bound to a particular theory or explanation, we believe that one cause of the instability of known sulfonated polystyrene membranes that have heretofore been applied to proton exchange membrane fuel cells is related to the tertiary hydrogen atoms on the main aliphatic chain of polystyrene. In particular, we have discovered that these tertiary hydrogen atoms are prone to degradation at fuel cell operating conditions. We have found that by eliminating the tertiary hydrogen atoms and replacing them with a covalently bonded group or radical, a more stable membrane suitable for use in proton exchange membrane fuel cells is formed. An exemplary embodiment of the membrane of this invention is a sulfonated styrene polymer membrane in which the tertiary hydrogen atom has been replaced with a methyl group, resulting in the formation of a sulfonated poly(methylstyrene) membrane.

Although suitable for use in a proton exchange membrane fuel cell, pure poly(methylstyrene) membranes are relatively fragile. To address the fragility of these membranes, in accordance with one embodiment of this invention, a block thermoplastic elastomer is used to render the sulfonated poly(methylstyrene) membrane flexible.

As indicated by the '482 patent to Ehrenberg et al., less than a stoichiometric amount of sulfonation agent is employed to produce a styrene-based polymer membrane so as to limit the level of sulfonation to about 40% to about 60% of the available styrene molecular units because higher sulfonation levels decrease the strength of the membrane when they become hydrated. We have discovered that by employing a phosphonation agent in combination with a sulfonation agent, membranes having greater than 60% sulfonation levels that are stable when they become hydrated are produced. More particularly, we have discovered that the use of a combined stoichiometric excess of sulfonation and phosphonation agents produces membranes having sulfonation levels greater than 70% that are extremely stable when they become hydrated.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Definitions

As used herein, the term "tertiary hydrogen replacement group" refers to an ion, atom or radical used in place of the tertiary hydrogen atoms which are a part of the aliphatic chain of normal polystyrene.

As used herein, the term "polymer" generally includes, but is not limited to, homopolymers, copolymers, such as for example, block, graft, random and alternating copolymers, terpolymers, etc., and blends and modifications thereof. In addition, unless otherwise specifically limited, the term "polymer" also includes all possible geometric configurations of the molecule including, but not limited to, isotactic, syndiotactic, atactic and random symmetries.

The invention disclosed herein is directed to a proton exchange membrane fuel cell comprising an anode electrode, a cathode electrode and an electrolyte disposed between the anode electrode and the cathode electrode. The electrolyte is a proton exchange membrane comprising sulfonated poly(styrene) materials and phosphonated poly (styrene) materials comprising a tertiary hydrogen replacement group. More particularly, the proton exchange membrane of this invention comprises a plurality of acid-stable polymer molecules each having at least one ion-conducting polymer segment covalently bonded to at least one flexible connecting polymer segment, wherein the flexible connecting polymer segment is selected from the group consisting of and wherein the ionic conducting polymer segment is selected from the group consisting of wherein $R^1$, $R^2$, $R^3$ and $R^4$ are selected from the group consisting of hydrogen, phenyl, substituted phenyls and lower alkyls, $R^5$ is selected from the group consisting of hydrogen, chlorine or lower alkyls, $R^6$ is selected from the group consisting of hydrogen and methyl, $R^7$ is selected from the group consisting of —$SO_3H$, —$PO_3H_2$ and combinations thereof, Ar is phenyl, and m, n, p, and q are zero or integers in the range of about 50 to about 10,000.

Figure 1A:
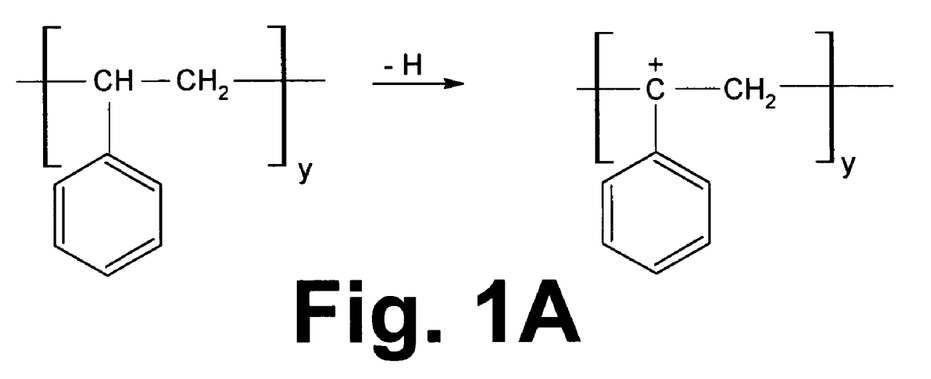
FIGS. 1A and 1B show the mechanism for undesirable carbonium ion formation in a polystyrene membrane.
Figure 1B:
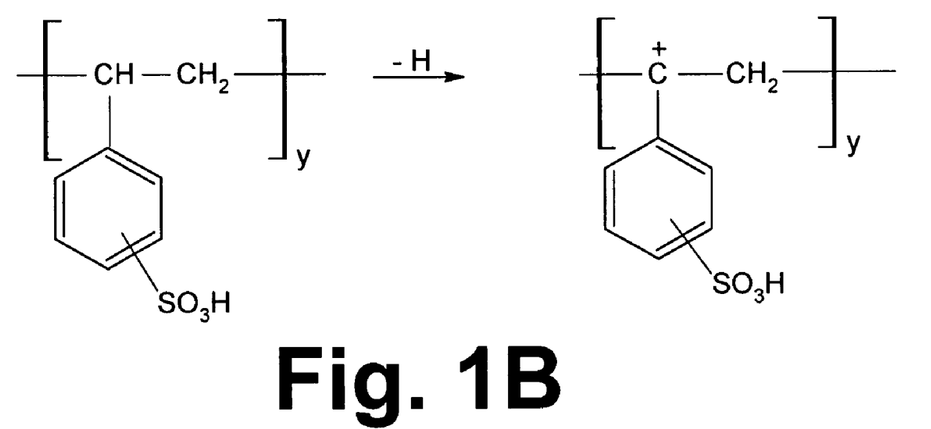
Figure 2:
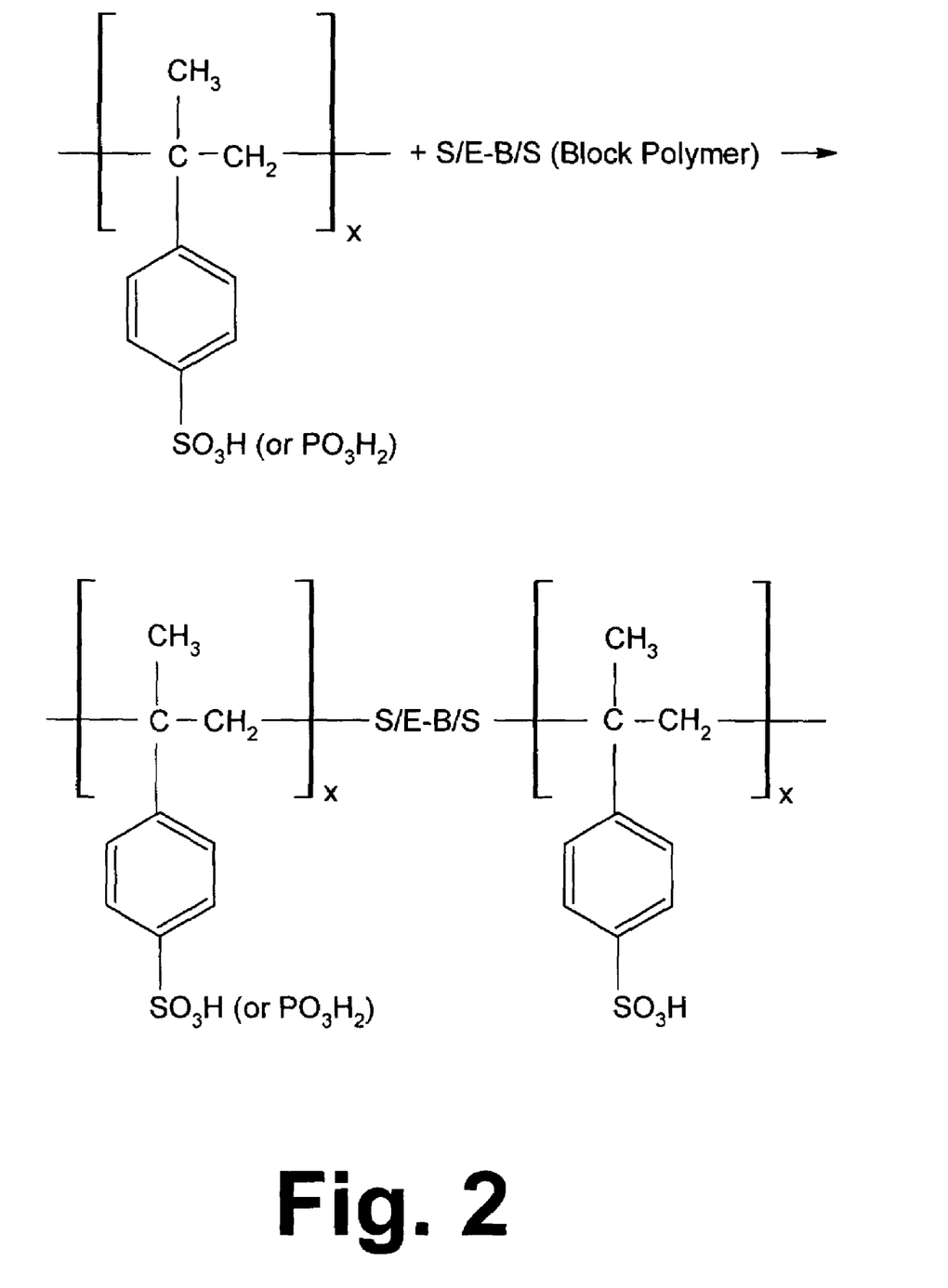
FIG. 2 is a diagram showing the formulation of a proton exchange membrane in accordance with one embodiment of this invention.
Figure 3A:
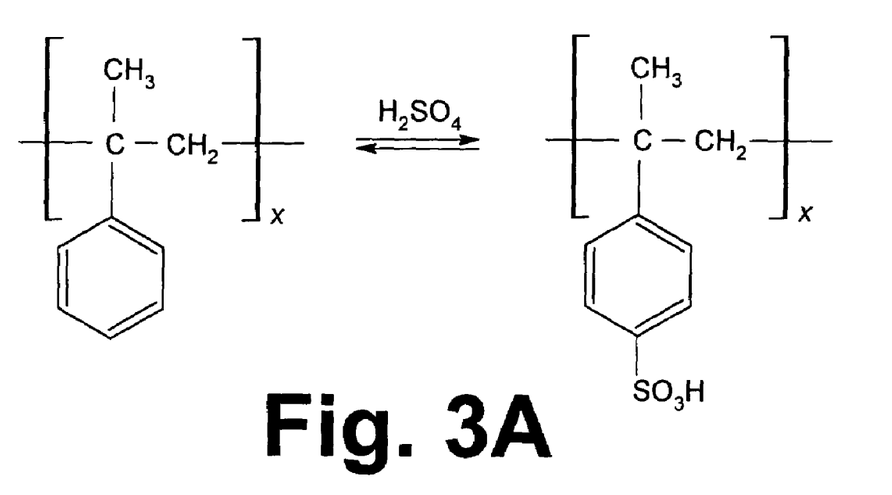
FIGS. 3A and 3B show reactions for the formation of sulfonated and phosphonated poly(methylstyrene)
Figure 3B:
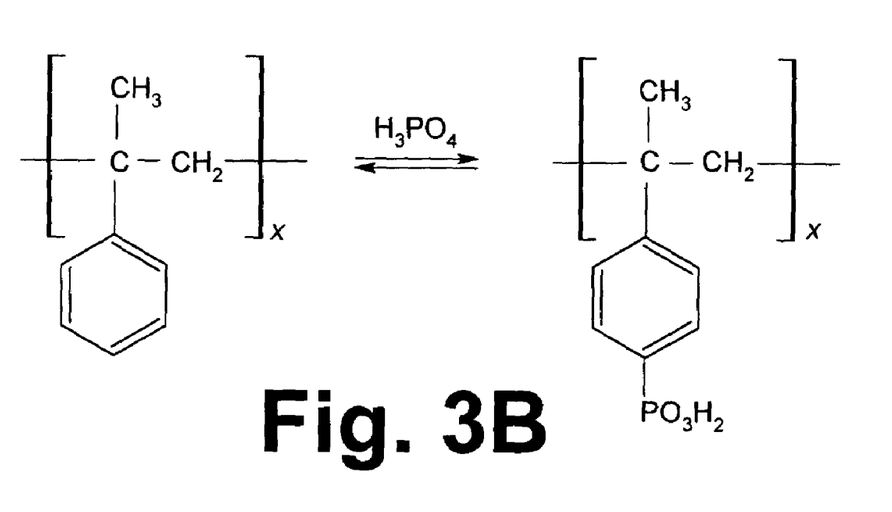

As previously stated, we believe that the tertiary hydrogen atoms on the main aliphatic chain of polystyrene are a contributing factor to the instability exhibited by conventional sulfonated polystyrene membranes employed in proton exchange membrane fuel cells. FIGS. 1A and 1B show one mechanism by which polystyrene and sulfonated polystyrene form a tertiary carbonium ion, which can lead to rearrangement of the entire chain, resulting in undesirable breaks in the chain. Under fuel cell operating conditions, there is a tendency for the bond between the carbon and tertiary hydrogen atom to break, resulting in the undesirable formation of the carbonium ion. The sulfonated benzene easily leaves the polymer chain as a result of which proton conductivity decreases. Accordingly, we have discovered that any group may be used to replace the tertiary hydrogen atom where the resulting covalent bond is stronger than the C—H bond. In accordance with a particularly preferred embodiment, as shown in FIG. 2, the tertiary carbonium ion formation is eliminated by replacing the tertiary hydrogen atom with a methyl group. Suitable inorganic ions for replacement of the tertiary hydrogen atom include, but are not limited to, fluoride, chloride, bromide, etc. Sulfonation of poly(α-methylstyrene) produces a homogeneous distribution of sulfonic acid groups in the polymer to improve proton conductivity, all the while preventing the membrane from degradation and from becoming soluble in water.

Figure 6:
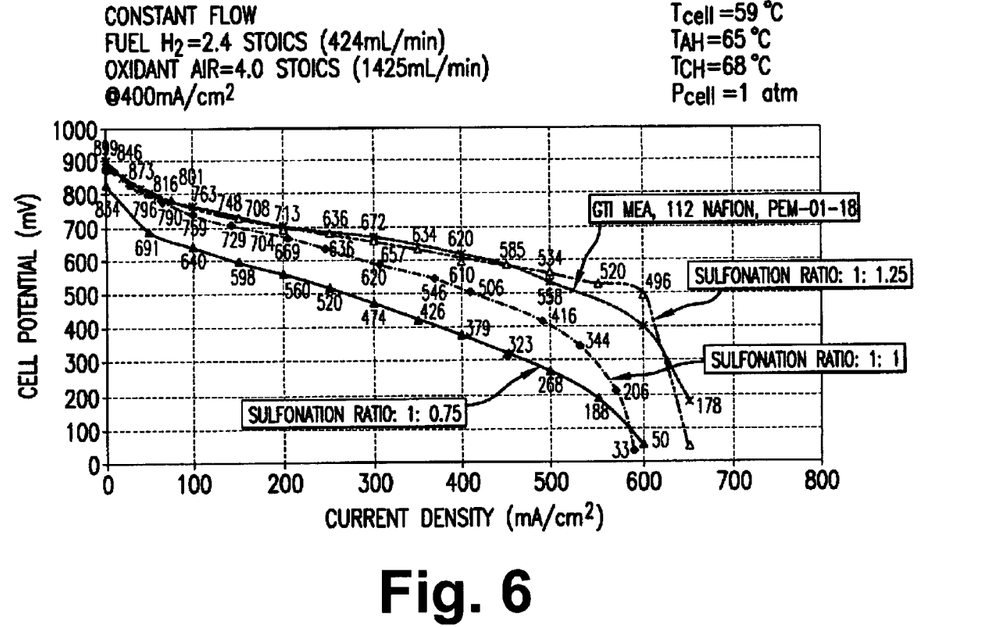
FIG. 6 is a diagram showing a comparison of the performance of a proton exchange membrane fuel cell using proton exchange membranes in accordance with this invention having different sulfonation ratios of styrene versus acid.

Experimental results from the evaluation of conventional membranes in which less than a stoichiometric amount of sulfonating agent is used to prepare the membrane demonstrate a substantial drop-off in performance compared to membranes in which greater than a stoichiometric amount of sulfonating agent is employed, as shown in FIG. 6. However, as taught by the '482 patent to Ehrenberg et al., less than a stoichiometric amount of sulfonating agent to produce styrene-based polymer membranes so as to limit the level of sulfonation to about 40% to about 60% of the available styrene molecular units is required to maintain the strength of the membranes when they become hydrated.

Figure 7:
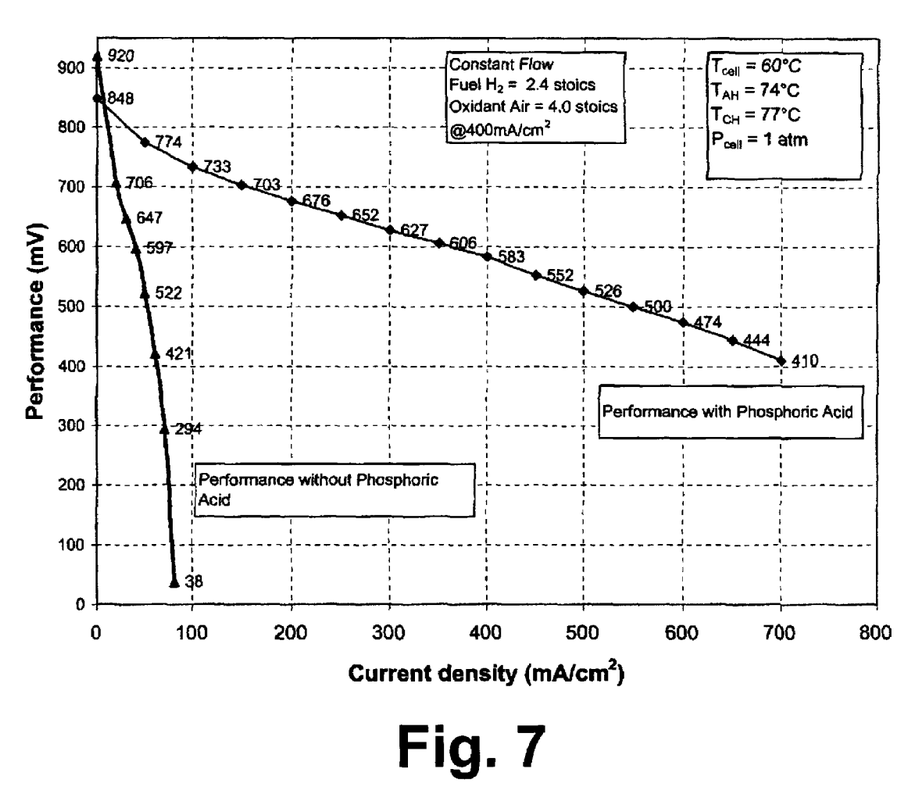
FIG. 7 is a diagram showing the effect of phosphonation of the proton exchange membrane in accordance with this invention on the performance of a proton exchange membrane fuel cell.
Figure 10:
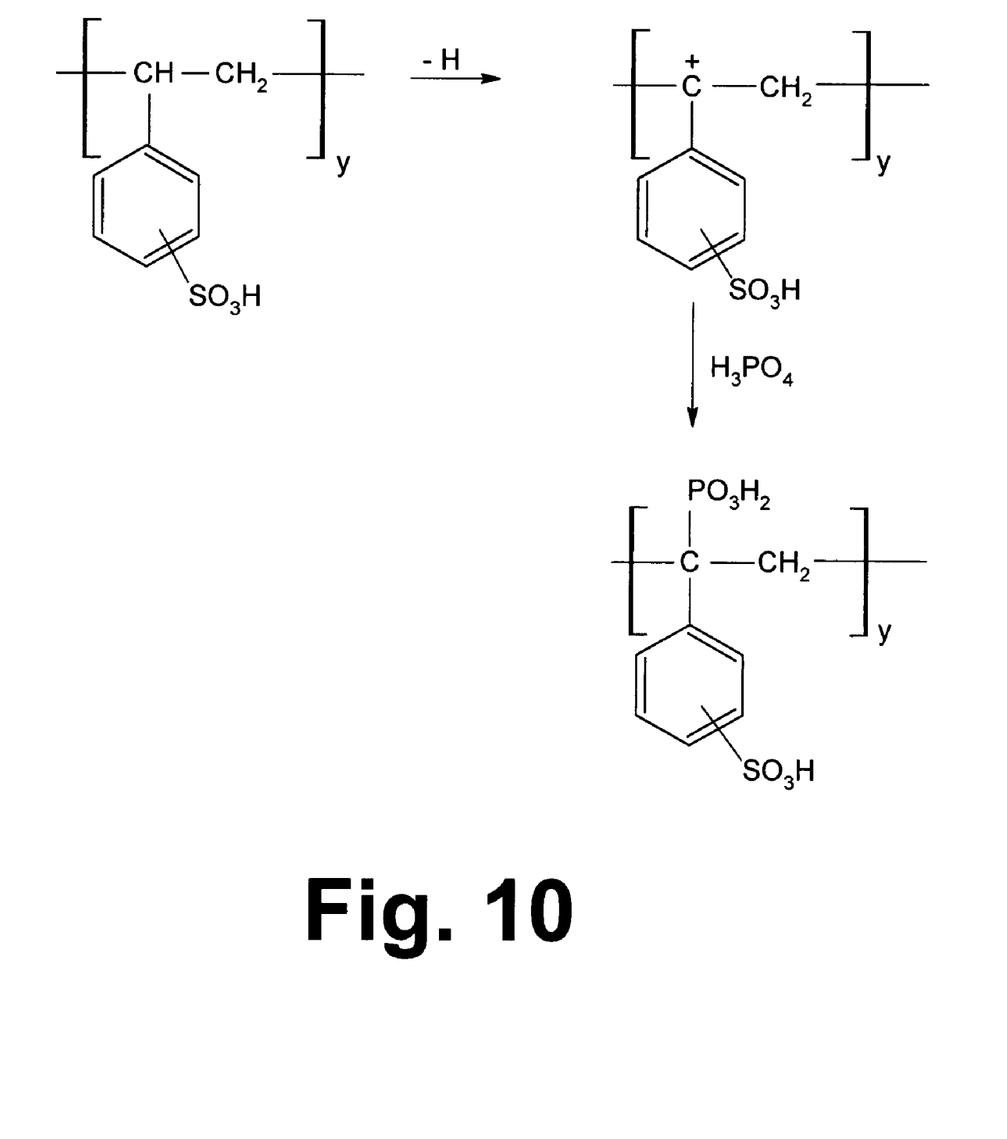
FIG. 10 is a diagram showing a membrane structure in accordance with one embodiment of this invention in which the active carbonium from the block polymer is eliminated.

In accordance with one preferred embodiment of this invention, a phosphonating agent, in addition to a sulfonating agent, is reacted with the styrene-based polymer, which enables higher levels of sulfonation than previously indicated as being possible to provide a stable membrane. Without wishing to be bound to any particular theory, the increased membrane stability is believed, at least in part, to be the result of the elimination of the active carbonium from the styrene block polymer comprising the block thermoplastic elastomer in the presence of a phosphonating agent such as phosphoric acid as shown in FIG. 10. In addition, as shown in FIG. 7, the addition of phosphonates to the membrane provides a substantial improvement in membrane performance compared to sulfonated membranes having no phosophonates.

In accordance with a particularly preferred embodiment of this invention, the amount of sulfonating agent and phosphonating agent employed to produce the proton exchange membrane is such that the styrene molecular units are either sulfonated or phosphonated. It is well known to those skilled in the art that the presence of an activating group, such as a methyl group, on a benzene ring activates all of the positions of the benzene ring. It is also well known that, for an activated benzene ring, substitution occurs preferentially at the para position over substitution at either the meta- or ortho-positions of the ring. Accordingly, sulfonation and phosphonation of the styrene molecular units preferentially occurs at the para position of the benzene ring. Thus, the use of a combined stoichiometric excess of sulfonating and phosphonating agents in the production of the proton exchange membrane in accordance with this invention ensures the occurrence of complete or full para substitution. By complete or full para substitution, we mean that there is no hydrogen present at the para position of the benzene ring of the styrene molecular units. Analysis of the proton exchange membranes in accordance with one embodiment of this invention suggests that, in addition to the occurrence of complete para substitution, some amount of substitution may occur at the meta- and/or ortho-positions. In accordance with one preferred embodiment of this invention, the ratio of styrene to sulfonating agent is in the range of about 1:0.8 to about 1:1.6 and the ratio of styrene to phosphonating agent is in the range of about 1:0.2 to about 1:0.5.

The sulfonated poly(α-methylstyrene) membrane is, itself, very brittle. Accordingly, to address the brittleness of the membrane, in accordance with one embodiment of this invention as shown in FIG. 2, a block thermoplastic elastomer is incorporated into the sulfonated poly(α-methylstyrene) chain, resulting in a membrane having good flexibility, strength and elasticity. In accordance with one preferred embodiment of this invention, the block thermoplastic elastomer is a styrene block copolymer. In accordance with a particularly preferred embodiment, the styrene block copolymer comprises polystyrene, polyethylene and polybutylene. To provide additional ion conductivity, the styrene components of the styrene block copolymer are sulfonated or phosphonated.

The following examples describe procedures by which the membranes of this invention may be synthesized. These descriptions are exemplary in nature and should not in any way be deemed as limiting the scope of this invention.

EXAMPLE 1

In this example, a sulfonating agent, acetyl sulfate, is freshly prepared by adding a measured amount of aceticanhydride (9.0 g) in 1, 2, dichloroethane (15 ml) under a nitrogen atmosphere. The volume of 1, 2, dichloroethane is about twice the volume of the anhydride. The solution is cooled to about 5° C. after which concentrated sulfuric acid in a stoichiometric amount is added while the nitrogen is flowing. The molar amount of aceticanhydride is in slight excess to the sulfuric acid.

10.0 g of a block thermoplastic elastomer, e.g. polystyrene-block-polyethylene-ran-polybutylene-block-polystyrene (30% styrene) available from Aldrich Chemicals, and 3.0 g of poly(α-methylstyrene) (MW 9000, Aldrich Chemicals) are dissolved in 200 ml of 1,2, dichloroethane and 53 g of cyclohexane. The reaction flask is a 500 ml 3-neck round bottom flask fitted with a mechanical stirrer, condenser and an addition funnel with a nitrogen inlet. The reaction solution in the flask, which is maintained under nitrogen throughout the procedure, is heated to 50° C. The total amount of prepared acetyl sulfate is then transferred in through the addition funnel and slowly added to the polymer solution over a period of about 15 minutes. The reaction is stirred for about 3 hours at 50° C. After 3 hours, the reaction is stopped by adding 10 ml of isopropanol. The resulting solution is cooled and bottled for further use. The ratio of elastomer to plastic (polystyrene+polymethylstyrene) in accordance with this procedure is about 53.4/46.6.

Membrane preparation is achieved by adding 15 ml of toluene to 30 g of sulfonated polymer solution and mixed for 15 minutes. The solution is filtered, and then the membrane is cast on a TEFLON substrate and dried under a hood to evaporate most of the solvent. Finally, the membrane is dried in an oven for about 2 hours at about 110° C. The membrane is recovered as a flat sheet by stripping it from the substrate.

EXAMPLE 2

In this example, a sulfonating agent is prepared as in Example 1.

10.0 g of a block thermoplastic elastomer, e.g. polystyrene-block-polyethylene-ran-polybutylene-block-polystyrene (30% styrene) available from Aldrich Chemicals, and 3.0 g of poly(α-methylstyrene) (MW 9000, Aldrich Chemicals) are dissolved in 200 ml of 1,2, dichloroethane and 53 g of cyclohexane. The reaction flask is a 500 ml 3-neck round bottom flask fitted with a mechanical stirrer, condenser and an addition funnel with a nitrogen inlet. The reaction solution in the flask, which is maintained under nitrogen throughout the procedure, is heated to 50° C. The total amount of prepared acetyl sulfate is then transferred in through the addition funnel and slowly added to the polymer solution over a period of about 15 minutes. The reaction is stirred for about 1.5 hours at 50° C. After 1.5 hours, phosphoric acid is added and the reaction is allowed to stir for another 1.5 hours. The function of the phosphoric acid is to slow down the sulfonation reaction so that the membrane is flexible, strong and stable in the proton exchange membrane fuel cell. After a total reaction time of 3 hours, the reaction is stopped by adding 10 ml of isopropanol. The resulting solution is cooled and bottled for further use. The ratio of elastomer to plastic (polystyrene+polymethylstyrene) in accordance with this procedure is about 53.4/46.6.

The membrane is prepared by adding 15 ml of toluene and 10 ml of cyclohexane to 30 g of sulfonated polymer solution and mixed for 15 minutes. The solution is filtered after which the membrane is cast on a TEFLON substrate and dried under a hood to evaporate most of the solvent. The membrane is then dried in an oven at 110° C. for about 2 hours. The membrane is recovered as a thin flat film by stripping from the substrate. In this example, the thickness of the membrane is about 2 mils.

Figure 4:
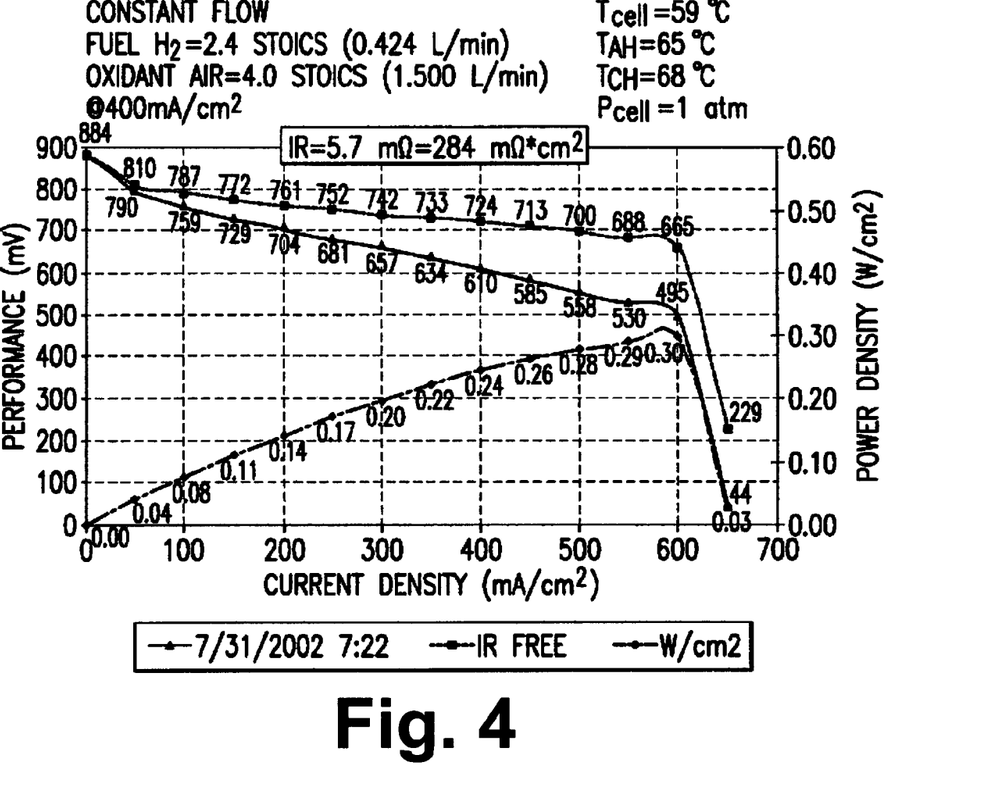
FIG. 4 is a diagram showing the polarization curve of a proton exchange membrane fuel cell using a proton exchange membrane in accordance with one embodiment of this invention.

FIG. 4 shows a polarization curve for a proton exchange membrane fuel cell using a sulfonated poly((X-methylstyrene) membrane in accordance with one embodiment of this invention. The Pt catalyst loading is 0.5 mg/cm² on each side. The data show that membranes in accordance with this invention provide acceptable performance in a proton exchange membrane fuel cell.

Figure 5:
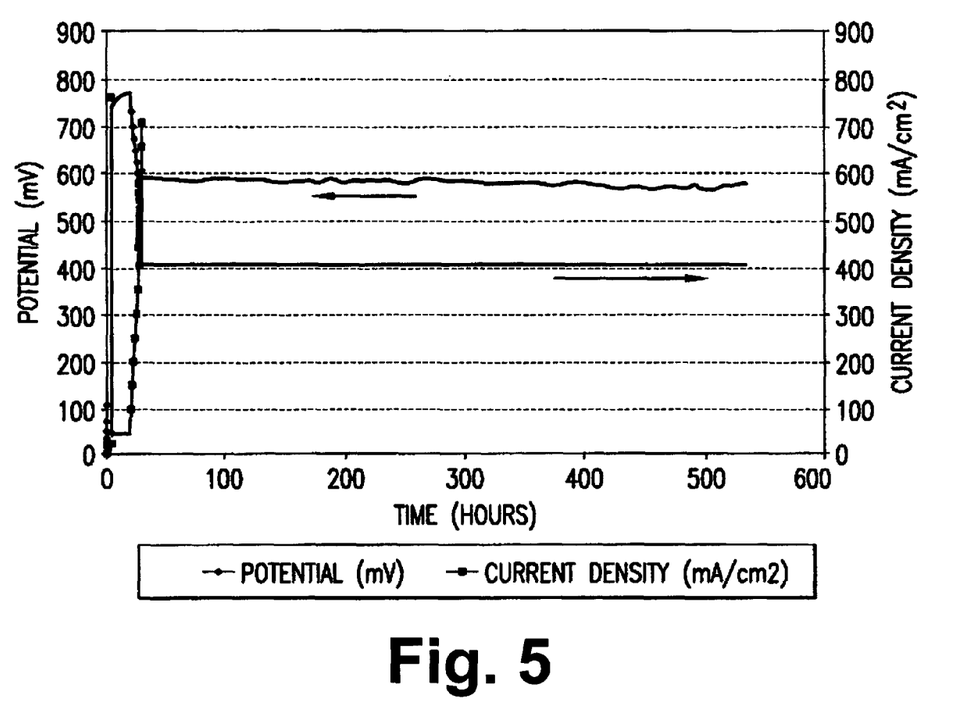
FIG. 5 is a diagram showing the results of an endurance test on a proton exchange membrane fuel cell using a proton exchange membrane in accordance with one embodiment of this invention.

FIG. 5 is a diagram showing the results of a lifetime test conducted on a proton exchange membrane fuel cell operating at a current density of 400 mA/cm² using a sulfonated poly(α-methylstyrene) membrane in accordance with one embodiment of this invention. As can be seen, over the period of time shown therein, performance of the cell is essentially constant at a level of about 600 mV.

Figure 8:
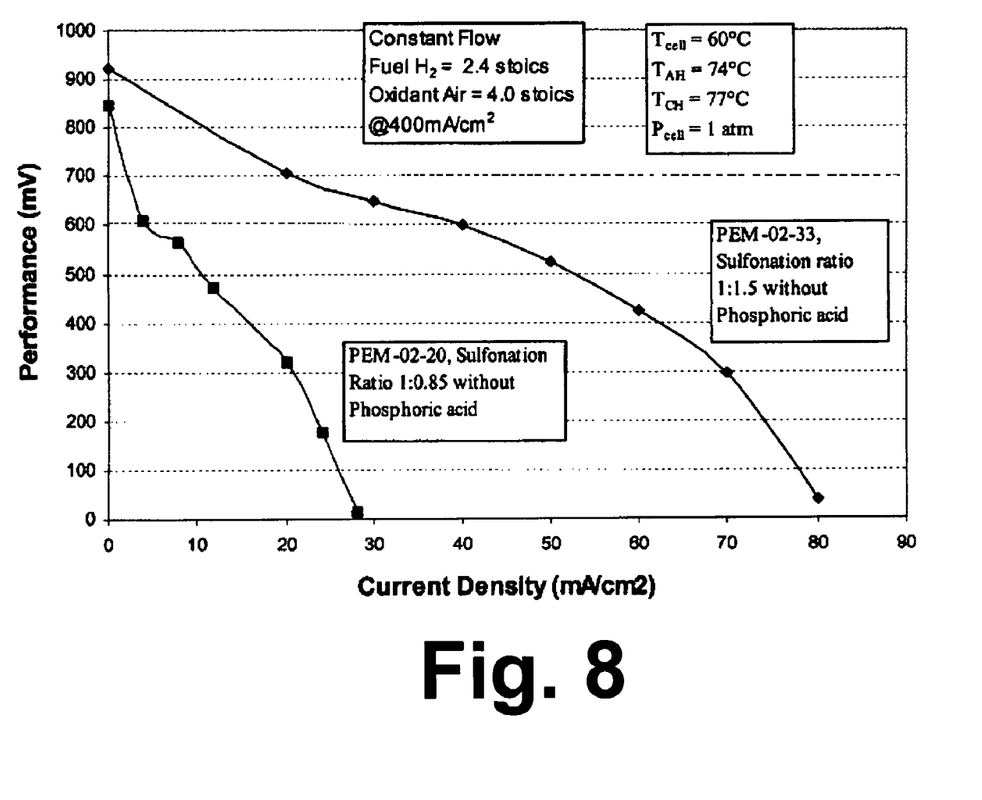
FIG. 8 is a diagram comparing the performance of prior art proton exchange membranes with proton exchange membranes in accordance with this invention.

FIGS. 6 and 8 show a performance comparison between proton exchange membrane fuel cells employing membranes in accordance with this invention at different sulfonation ratios of styrene versus acid. The mole ratio of styrene to acid is very important for producing a membrane in accordance with this invention having the desired conductivity and stability in a proton exchange membrane fuel cell. In addition, acid composition is also an important factor in the stability of the membrane. As shown in FIG. 6, relative to a conventional NAFION membrane, a membrane in accordance with one embodiment of this invention, which comprises both sulfonated and phosphonated styrene molecular units, having a styrene to acid ratio of about 1:1.25 has a performance nearly the same as the performance of the NAFION membrane. In FIG. 8, in which the membrane has not been subjected to phosphonation, performance of the membrane having a styrene to acid ratio of about 1:1.5 is substantially better than the performance of a conventional membrane produced using less than a stoichiometric amount of sulfonating agent.

Figure 9:
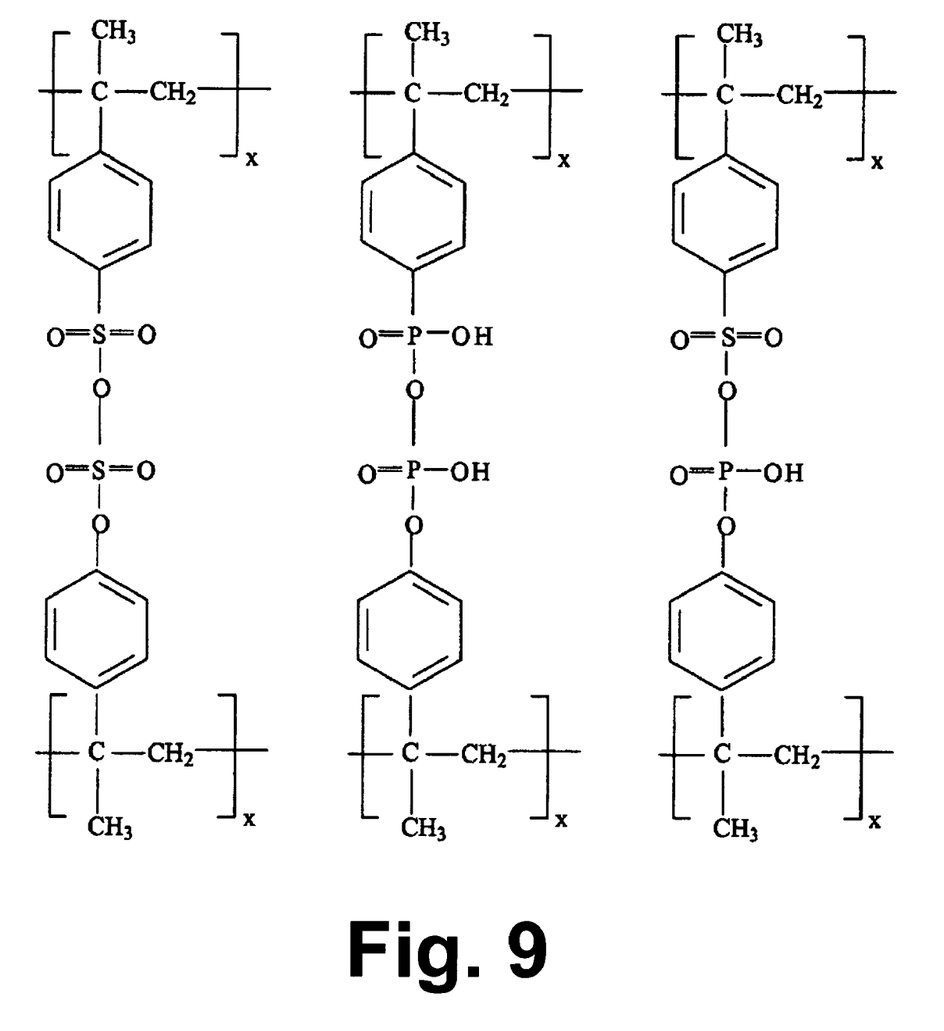
FIG. 9 is a diagram showing various possible cross-linking arrangements existing in the proton exchange membranes in accordance with this invention.

Analysis of the proton exchange membranes in accordance with this invention also suggests the occurrence of some crosslinking between phosphonated and/or sulfonated styrene molecular units. Possible crosslinking arrangements are shown in FIG. 9.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. An apparatus for generating electricity comprising:
   an anode electrode;
   a cathode electrode; and
   a proton exchange membrane disposed between said anode electrode and said cathode electrode, said proton exchange membrane comprising where Y is a covalently bonded group and R is substantially 100% substituted with an acid selected from the group consisting of —$SO_3H$, —$PO_3H_2$ and mixtures thereof.

2. An apparatus in accordance with claim 1, wherein said proton exchange membrane further comprises a block thermoplastic elastomer.

3. An apparatus in accordance with claim 1, wherein said covalently bonded group is an organic group.

4. An apparatus in accordance with claim 1, wherein said covalently bonded group comprises an inorganic group.

5. An apparatus in accordance with claim 2, wherein said block thermoplastic elastomer is a styrene block copolymer.

6. An apparatus in accordance with claim 5, wherein said styrene block copolymer comprises polystyrene, polyethylene and polybutylene.

7. An apparatus in accordance with claim 1, wherein said covalently bonded group is an alkyl group.

8. An apparatus in accordance with claim 1, wherein said covalently bonded group is an organic radical selected from the group consisting of methyl, ethyl, propyl and butyl.

9. In a proton exchange membrane fuel cell comprising an anode, a cathode and a proton exchange membrane disposed between said anode and said cathode, the improvement comprising:

said proton exchange membrane comprising a substantially 100% sulfonated and phosphonated poly(styrene) material comprising a tertiary hydrogen replacement group.

10. A proton exchange membrane fuel cell in accordance with claim 9, wherein said tertiary hydrogen replacement group is a covalently bonded group.

11. A proton exchange membrane fuel cell in accordance with claim 9, wherein said proton exchange membrane further comprises a block thermoplastic elastomer.

12. A proton exchange membrane fuel cell in accordance with claim 11, wherein said block thermoplastic elastomer is a styrene block copolymer.

13. A proton exchange membrane fuel cell in accordance with claim 12, wherein said styrene block copolymer comprises polystyrene, polyethylene and polybutylene.

14. In a proton exchange membrane fuel cell comprising an anode, a cathode and a proton exchange membrane disposed between said anode and said cathode, the improvement comprising:

said proton exchange membrane comprising a substantially 100% sulfonated and phosphonated poly(styrene) material and a block thermoplastic elastomer, said sulfonated and phosphonated poly(styrene) material comprising a tertiary hydrogen replacement group.

15. A proton exchange membrane fuel cell in accordance with claim 14, wherein said block thermoplastic elastomer is a styrene block copolymer.

16. A proton exchange membrane fuel cell in accordance with claim 15, wherein said styrene block copolymer comprises polystyrene, polyethylene and polybutylene.

17. A proton exchange membrane fuel cell in accordance with claim 16, wherein said tertiary hydrogen replacement group is a covalently bonded group.

* * * * *